United States Patent [19]

Takemura et al.

[11] Patent Number: 4,722,412

[45] Date of Patent: Feb. 2, 1988

[54] MOTORCYCLE

[75] Inventors: Hiroo Takemura, Asaka; Kaoru Yamamoto, Tokyo; Takashi Kudo, Shiki, all of Japan

[73] Assignee: Honda Giken Kogyo Kabushiki Kaisha, Tokyo, Japan

[21] Appl. No.: 831,946

[22] Filed: Feb. 24, 1986

[30] Foreign Application Priority Data

Mar. 1, 1985 [JP] Japan .............................. 60-28086[u]
Mar. 2, 1985 [JP] Japan .............................. 60-29165[u]

[51] Int. Cl.[4] .............................................. B60K 13/02

[52] U.S. Cl. .................................... 180/229; 180/681; 180/68.3

[58] Field of Search ...................... 180/68.3, 68.4, 219, 180/225, 229, 296, 291

[56] References Cited

U.S. PATENT DOCUMENTS 4,461,366 7/1984 Honda ................................. 180/229
4,570,740 2/1986 Hara .................................. 180/68.4
4,611,679 9/1986 Yanagishita et al. .............. 180/68.3

*Primary Examiner*—John J. Love
*Assistant Examiner*—Richard Camby
*Attorney, Agent, or Firm*—Armstrong, Nikaido, Marmelstein & Kubovcik

[57] ABSTRACT

A motorcycle including a pair of right and left main frame members, an engine being disposed at a lower part of the main frame members, a fuel tank being disposed at an upper part thereof, whereby the motorcycle is provided with a partition wall disposed between the main frame members and the engine. The upper part of this partition wall forms an air passage extending forward from backward of a vehicle body. At a rear portion of this air passage, a carburetor is exposed after penetrating the partition wall. The front end portion of the partition wall forms an air guiding portion extending to the front part of a radiator after riding over the radiator. The carburetor is effectively cooled by travelling air guided by the air passage via the air guiding portion. The partition wall also serves to prevent transmission of radiation of engine to the upper portion of the vehicle body.

7 Claims, 7 Drawing Figures

MOTORCYCLE

BACKGROUND OF THE INVENTION

This invention relates to a motorcycle, and more particularly to a motorcycle in which influence of heat generated from an engine thereof is prevented.

A motorcycle is usually equipped with a main frame member extending along an upper portion of a vehicle body backward from a head pipe disposed at the front of the center line of the vehicle body, and an engine is located at a lower part of the main frame member. Mounted to the main frame member is a fuel tank astriding thereon. A motorcycle is usually equipped with one main frame member disposed along the center line of the vehicle body, but there are also many motorcycles which are equipped with a pair of right and left main frame members bifurcated rightward and leftward from the head pipe.

The engine is cooled by travelling air blowing in around the engine from the front while the motorcycle is running. A motorcycle equipped with a water cooled engine is disposed at a front part of the engine with a radiator.

In such a motorcycle as mentioned, not only the engine main body and radiator, but also a carburetor located at a rear part are desirably sufficiently cooled so that intaken air temperature of the engine is lowered to increase suction efficiency. Further, temperature of the air itself intaken into the carburetor through an air cleaner is desirably as low as possible.

Furthermore, heat of the engine is preferably not transmitted to the upper portion of the vehicle body as much as possible.

SUMMARY OF THE INVENTION

It is therefore a main object of the present invention to provide a motorcycle, wherein a carburetor disposed at a rear part of an engine can be sufficiently cooled.

It is another object of the invention to provide a motorcycle, wherein heat of the engine is not transmitted to the upper portion of a vehicle body.

It is a further object of the invention to provide a motorcycle, wherein a sufficient quantity of cooling air can be sent into a carburetor located at the back without being interrupted by a radiator located at the front.

In order to achieve the above objects, there is essentially provided a motorcycle equipped with a pair of right and left main frame members, an engine being disposed at a lower part of the main frame members, a fuel tank being disposed at an upper part thereof, whereby the motorcycle is provided with a partition wall for partitioning off a vehicle body into the main frame member side and the engine side to form an air passage extending in the forward and backward direction at a lower part of the main frames, a carburetor disposed at a rear part at the upper portion of the engine penetrating the partition wall and being projected between the right and left main frame members.

According to the present invention, the partition wall together with a fuel tank covering thereabove and the main frame members at both sides thereof form an air passage, along which travelling air freely blows out from the front of the vehicle body toward the back to effectively cool a carburetor exposed in the air passage. Further, since this air flow is insulated from heat of the engine by the partition wall, temperature increase is small and cooling effect is large. Accordingly, this air can be taken into the carburetor through an air cleaner and used as an engine intake air. Of course, this partition wall also functions as a thermal insulation board for preventing transmission of heat of the engine to the upper portion of the vehicle body.

According to other features of the present invention, a front end portion of the partition wall serves as an air guiding portion extending forward over the upper portion of a radiator disposed at the front part of the engine. Accordingly, a part of travelling air flowed into the front face of the radiator from the front thereof is guided by the air guiding portion so that the air passes over the radiator to proceed directly toward the carburetor at the back thereof, thereby effectively cooling the carburetor.

DETAILED DESCRIPTION OF THE PREFERRED EMBODIMENTS

Figure 1:
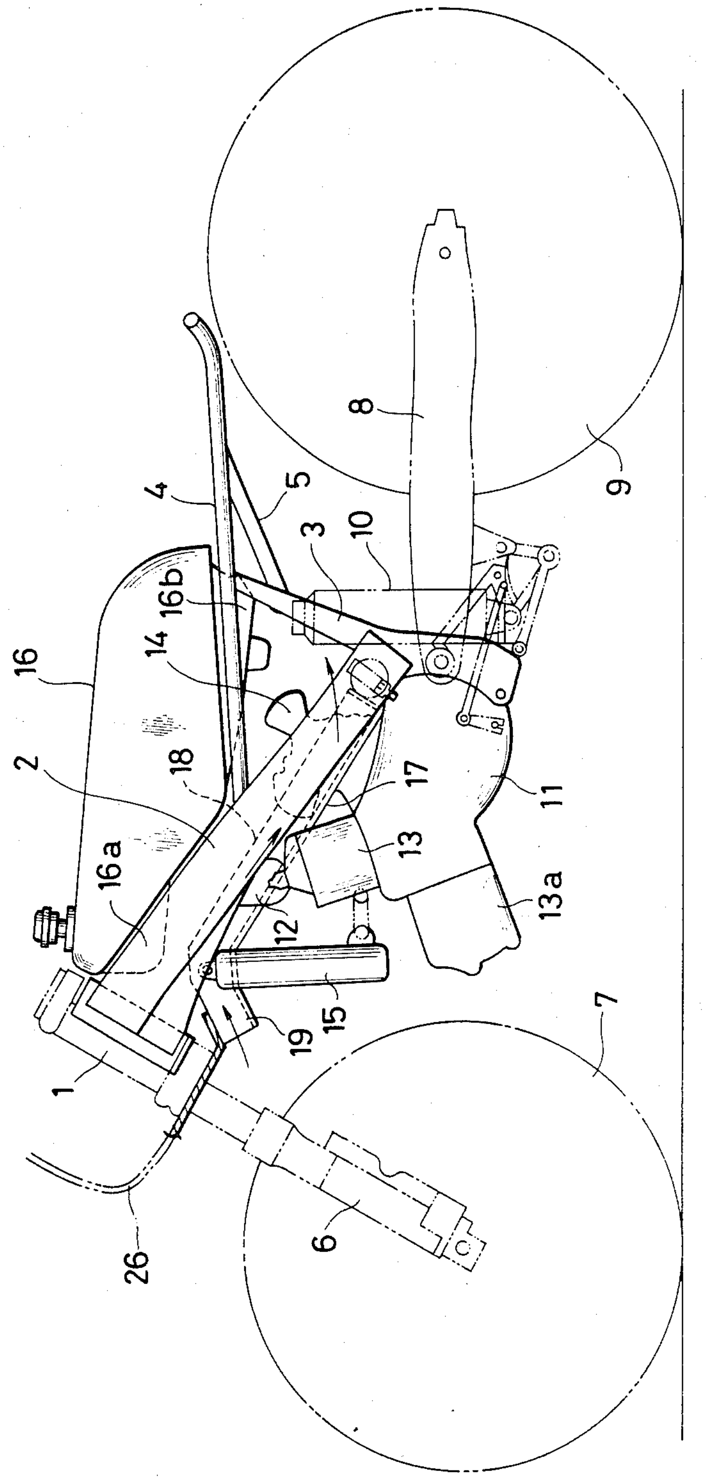
FIG. 1 is a side view of one embodiment of the present invention.

One embodiment of the present invention will be described with reference to the accompanying drawings. FIG. 1 illustrates a side view of an motorcycle to which the present invention is applied. The vehicle frame of the motorcycle comprises a head pipe 1, a pair of right and left main frame frames 2 having a square shape in section fixedly attached at the front ends thereof to the head pipe 1 and extending in the downward direction at angles backwardly (see FIG. 2), a center pillar 3 fixedly attached to the rear end portions of the respective main frame members 2 and extending in the generally vertical direction, a pair of right and left seat rails 4 fixedly attached at the intermediate portions thereof to the upper end portions of the center pillar 3 and at the front ends thereof to the intermediate portion of the main frame members 2 and extending backwardly, and a back stay 5 disposed between the center pillar 3 and the seat rails 4. The head pipe 1 is pivotally attached with a front fork 6 through a steering mechanism. A front wheel 7 is supported by the front fork 6. Swingably and pivotally attached to the lower portion of the center pillar 3 is a rear fork 8 by which a rear wheel 9 is supported. A rear cushion 10 disposed between the vehicle frame and rear fork 8. An engine 11 is suspended at a lower part of the main frame members 2. The engine 11 is mounted at the rear and lower portion to the lower end portion of the center pillar 3 and at the front and upper portion to the main frame members 2 through an engine hanger 12. The engine 11 itself also functions as a reinforcing member of the vehicle body frame. The engine 11 shown in the figure is a V-type engine. The engine 11 includes a cylinder 13 disposed in the generally vertical direction and a cylinder 13a disposed in the generally longitudinal direction. Disposed at the rear and upper portion of the engine 11 is a carburetor 14, while disposed at the front part thereof is a radiator 15.

Located at an upper part of the main frame members 2 and the seat rails 4 is a fuel tank 16 which is brideged over between the pair of right and left main frame members 2 and the seat rails 4. Accordingly, the upper part of the engine 11 is covered with the bottom of the fuel tank 16. The intermediate portion in the width direction of this bottom is projected between the main frame members 2 and the seat rails 4 as shown by 16*a* and 16*b* in FIG. 1.

At the upper part of the engine 11, there is provided a partition wall 17 adapted to define the engine 11 side and the main frame members 2 side. The partition wall 17, as shown in FIG. 1, extends from the upper portion of the radiator 15 to the rear and upper portion of the engine 11 along the generally upper surface of the engine 11 in the longitudinal direction, and side walls 18 are provided along both sides thereof, respectively. The front end portion of the partition wall 17 extends so far as to the front part of the radiator 15 exceeding the upper portion of the radiator 15 and functions as an air guiding portion 19. At the outer side of the side wall 18, the main frame members 2 extend adjacent thereto and therealong. The upper part of the partition wall 17 is formed as an air passage of a duct-shape sheltered at both sides thereof with the side wall 18 and the main frame member 2, and covered at the upper portion thereof with the bottom of the fuel tank 16. When travelling, air at the front part of the radiator 15 is guided to the air guiding portion 19 and flows into the air passage defined on the partition wall 17, and then, as shown by an arrow in FIG. 1, freely flows backwardly along the air passage. The partition wall 17 is provided at the rear portion thereof with a suitable hole, through which the carburetor 14 projects to the upper part of the partition wall 17 and between the right and left main frame members 2. Accordingly, the carburetor 14 is contacted with the air flowing over the partition wall 17 along the air passage and effectively cooled.

The partition wall 17 functions as a guiding member for regulating the flow of air as mentioned. In addition, the partition wall 17 functions as a heat insulating member for insulating radiation from the engine 11. Since the air flowing over the partition wall 17 hardly receives influence of heat radiated from the engine 11 and held in a low temperature, a satisfactory cooling effect is obtainable. This air may be taken in the carburetor 14 as an engine intake air through an air cleaner (not shown).

Figure 2:
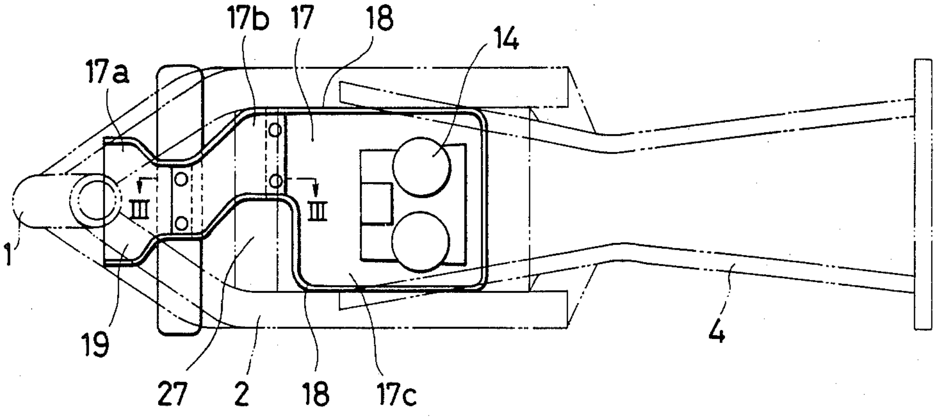
FIG. 2 is a plan view of a partition wall according to the above embodiment.

Preferably, the partition wall 17, as shown in FIG. 2 and others thereafter, is divided into, for example, three portions 17*a*, 17*b* and 17*c* and such divided portions 17*a*, 17*b* and 17*c* are mutually connected by suitable means. With the foregoing arrangement, the partition wall 17 can be set up and removed with ease. In addition, when in maintenance work, only the required portions can be removed, thereby increasing the work efficiency.

Figure 3:
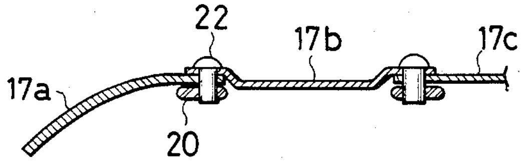
FIG. 3 is a sectional view taken on line II—II of FIG. 2.
Figure 4:
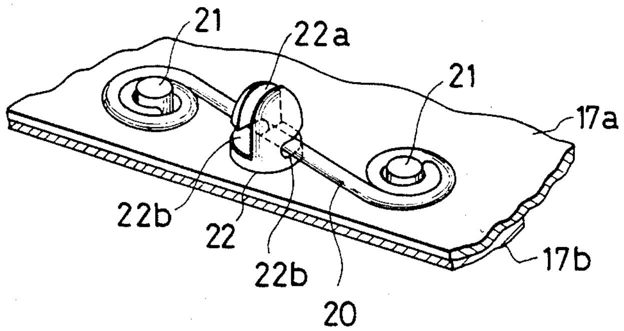
FIG. 4 is a perspective view of a connecting portion of a part of the partition wall when viewed from back.

FIGS. 2 through 4 illustrate examples of the respective portions 17*a*, 17*b* and 17*c* connected with one another by known fastener per se. In this connecting means, one of the portions, for example, portions 17*a* is fixed at the rear surface with a spring member 20 with both ends thereof formed in a spiral-shape by a pin member 21, and a plug member 22 is inserted in holes each formed in the portions 17*a* and 17*b* and which are in alignment with each other. Firstly, the lineal portion of the spring member 20 is inserted in a groove 22*a* formed at one end of the plug member 22 and extending in the radial direction and thereafter, the plug member 22 is turned to cause the lineal portion to engage in the groove 22*b* of the circumferencial direction so that both the portions 17*a* and 17*b* will be connected with each other.

In this way, the portions 17*b* can be easily removed from the other portions 17*a* and 17*c* disposed at the front and back thereof. When the portion 17*b* is removed, an opening for engine maintenance is formed in the partition wall 17. Otherwise, the portions 17*a* and 17*c* may be arranged as such that they are connected with each other at both side portions thereof to constitute one integral portion with an opening formed at the central portion thereof for engine maintenance, and the opening is detachably covered with a portion similar to the portion 17*b*.

Figure 5:
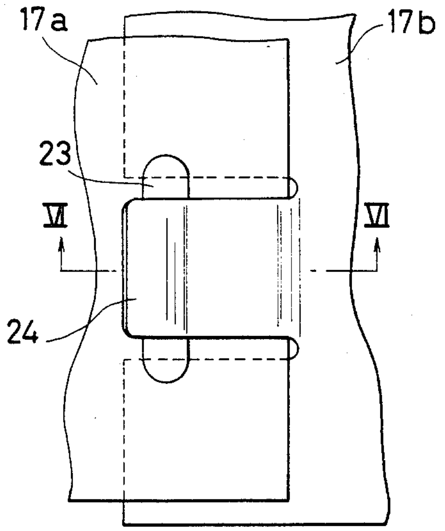
FIG. 5 is a top view showing a modified embodiment of the connecting portion of a part of the partition wall.
Figure 6:
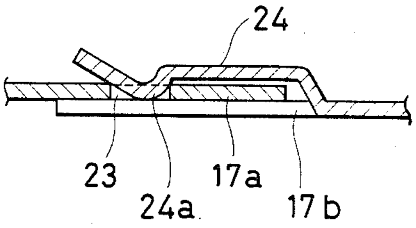
FIG. 6 is a sectional view taken on line VI—VI of FIG. 5.

FIG. 5 and FIG. 6 illustrate other connecting means. In this example, the partition wall 17 is formed of a synthetic resin material, and one of the portions, for example, portion 17*a* is formed at the connecting end portion with a through hole 23. The end portion of the other portion 17*b* forms a tongue piece 24 raised from the surface of the portion 17*b* at a portion corresponding to the through hole 23, and the front end thereof is formed with an engaging portion 24*a* adapted to engage in the through hole 23. In order to connect the portions 17*a* and 17*b* with each other, as shown in FIG. 6, the end portion of the portion 17*a* is sandwiched and held by the tongue piece 24 and the end portion of the portion 17*b* from above and under, and the engaging portion 24*a* is engaged in the through hole 23 by elasticity of the tongue piece 24. According to such connecting means just mentioned, required parts can be reduced in number. In addition, work efficiency is improved extensively.

Figure 7:
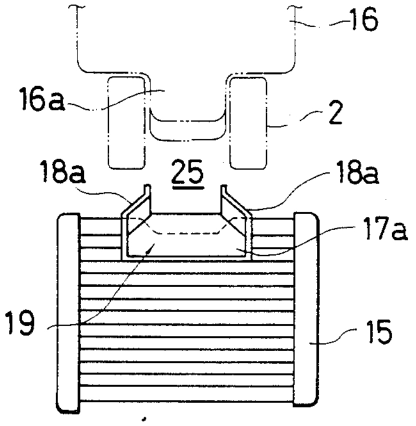
FIG. 7 is a front view of a radiator and an air guiding portion.

As described in the foregoing, the front end portion of the partition wall 17 forms the air guiding portion 19. FIG. 7 illustrates the front view of the air guiding portion 19. As apparent from FIGS. 7 and 1, the front end portion 17*a* of the partition wall 17 exceeds the upper portion of the radiator 15 and thereafter extends downwardly in the forward direction. The front end portion 17*a* is formed as such that the width thereof is gradually spread. Since the extending portion 18*a*, 18*a* of the partition side wall 18 extends along the peripheries of both sides of the front end portion 17*a*, the air guiding portion 19 is formed in a groove-shape. The upper part of the air guiding portion 19, as shown in FIG. 7, is covered with the main frame members 2 and the bottom of the fuel tank 16. These constitute an air passage 25 intercommunicating the front and back of the radiator 15. Since the air guiding portion 19 is formed low and wide at the front portion, a large quantity of travelling air can be smoothly guided backwardly after riding over the upper part of the radiator 15. The front end portion of the air guiding portion 19, as shown in FIG. 1, is supported by the rear end portion of a cowling 26 covering the front part of the head pipe 1.

The partition wall 17 is formed at the rear part of the radiator 15 and one side thereof with a concave portion 27. The concave portion 27 is formed in a position corresponding to the cylinder 13 disposed in the vertical direction. The partition wall 17 is disposed in such a manner as to avoid the cylinder 13 by means of the concave portion 27. Accordingly, air on the partition wall 17 is smoothly flowed into around the carburetor 14 at the rear part while avoiding the cylinder 13.

What is claimed is:

1. A motorcycle having a pair of right and left main frame members, an engine disposed below said main frame members, a fuel tank disposed above said main frame members, a seat disposed behind said fuel tank, a partition wall extending in the longitudinal direction of said motorcycle over said engine for dividing the main frame member side from the engine side and for forming an air passage at a lower part of the main frame members, and a carburetor disposed at a rear part at the upper portion of said engine projecting between said right and left main frame members through said partition wall forward of said seat.

2. A motorcycle according to claim 1, wherein said partition wall is formed of a plurality of portions disposed in the longitudinal direction and connected with one another.

3. A motorcycle according to claim 1 or claim 2, wherein said partition wall is provided with an opening for engine maintenance, said opening being detachably covered with a detachable piece.

4. A motorcycle according to claim 1, wherein said partition wall includes side walls projecting upwardly along both the right and left sides thereof.

5. A motorcycle according to claim 1 which further includes a radiator at a front part of said engine, and wherein said partition wall is formed at the front end portion with an air guiding portion extending to a front part of said radiator after riding over said radiator.

6. A motorcycle according to claim 5, wherein said air guiding portion is formed in a groove-shape by being provided with a side wall projecting upwardly along both sides thereof, the front portion thereof being formed low and wide.

7. A motorcycle according to claim 1, wherein said partition wall is formed with a concave portion for avoiding a cylinder of said engine sidewardly.

* * * * *